United States Patent
Hotham et al.

(10) Patent No.: US 11,663,019 B2
(45) Date of Patent: May 30, 2023

(54) RESTART CONTROLLER

(71) Applicant: MICROSOFT TECHNOLOGY LICENSING, LLC, Redmond, WA (US)

(72) Inventors: David Charles Hotham, Enfield (GB); Murray William Rogers, Enfield (GB); Sophie Stratton, Edinburgh (GB); Joseph Ellis Darracott Powell, London (GB); Matthew Ian Ronald Williams, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 17/244,945

(22) Filed: Apr. 29, 2021

(65) Prior Publication Data

US 2022/0350617 A1  Nov. 3, 2022

(51) Int. Cl.
  *G06F 9/4401*  (2018.01)
  *H04L 67/10*  (2022.01)
  *G06F 9/54*  (2006.01)

(52) U.S. Cl.
  CPC ............ *G06F 9/4416* (2013.01); *G06F 9/547* (2013.01); *H04L 67/10* (2013.01)

(58) Field of Classification Search
  CPC ......... G06F 9/4416; G06F 9/547; H04L 67/10
  USPC ........................................................... 713/2
  See application file for complete search history.

(56) References Cited

U.S. PATENT DOCUMENTS

| 2013/0227335 | A1* | 8/2013 | Dake | G06F 11/0709 714/4.2 |
| 2014/0108775 | A1* | 4/2014 | Kludy | H04L 67/34 713/2 |
| 2018/0359150 | A1* | 12/2018 | Perfect | H04L 43/20 |
| 2021/0136147 | A1* | 5/2021 | Giassa | H04L 12/2814 |

OTHER PUBLICATIONS

Balyshev, xing_kubernetes-deployment-restart-controller_v1.1.0_20190116, github.com (7 pages) (Year: 2019).*

(Continued)

*Primary Examiner* — Wing F Chan
*Assistant Examiner* — Leon Y Tseng
(74) *Attorney, Agent, or Firm* — Newport IP, LLC; Han K. Gim

(57) ABSTRACT

A native restart controller restarts services in a controlled manner. The services run in a cloud computing environment comprising a plurality of computing devices executing a plurality of Kubernetes pods comprising one or more containers. An indication is received of a deployment defining a service to be implemented in the cloud computing environment, the deployment including a desired number of instances of the service. An API is instantiated that is operable to provide a first state indicative of whether restarts are to be controlled by the restart controller and a second state indicating that a restart is required. In response to receiving an indication that restarts for the cluster are to be controlled by the restart controller and that a restart is required, the instances are restarted in a sequence in accordance with restart criteria associated with the service.

20 Claims, 5 Drawing Sheets

(56) References Cited

OTHER PUBLICATIONS

Serino, 5G Rollout_ How Kubernetes and Edge Computing is making 5G a reality, Jun. 1, 2020, cncf.io (5 pages) (Year: 2020).*
Rainville, How to Restarting Kubernetes Pods, CloudyTuts.com, Aug. 24, 2020 (3 pages) (Year: 2020).*
"Chart Development Tips and Tricks", Retrieved From: https://web.archive.org/web/20210131120355/https://helm.sh/docs/howto/charts_tips_and_tricks/, Jan. 31, 2021, 18 Pages.

* cited by examiner

RESTART CONTROLLER

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines or containers that appear and operate as independent computing resources. The data center can create, maintain or delete virtual machines or containers in a dynamic manner. Many platforms use Kubernetes as a container orchestration system for application deployment, scaling, and management. For scalability and redundancy, multiple instances of a service may be instantiated. The service may accept a configuration that is provided via a ConfigMap object in the Kubernetes cluster, which is mounted as a file into the service's container. To make a change to the configuration, the ConfigMap may be updated. Instances of services monitor the mounted file, identify the change, and act in response. For some services, acting on some configuration changes will require them to restart. It is with respect to these considerations and others that the disclosure made herein is presented.

SUMMARY

If a service restarts when it sees such a change, then all instances will typically restart, which can result in unwanted downtime. The present disclosure addresses the general situation where all instances of a microservice in a Kubernetes cluster simultaneously require a restart, whereby restarts are managed in a controlled manner to avoid unwanted downtime. In various embodiments, a new restart controller component is implemented in the Kubernetes cluster. A service may expose an API by which the service can declare a requirement to be restarted. The restart controller may control the requested restart in a controlled manner.

By providing such a restart controller, computing environments may operate more efficiently, and reduction or loss of services provided by service providers may be avoided or mitigated, providing for greater operational efficiency for service providers.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
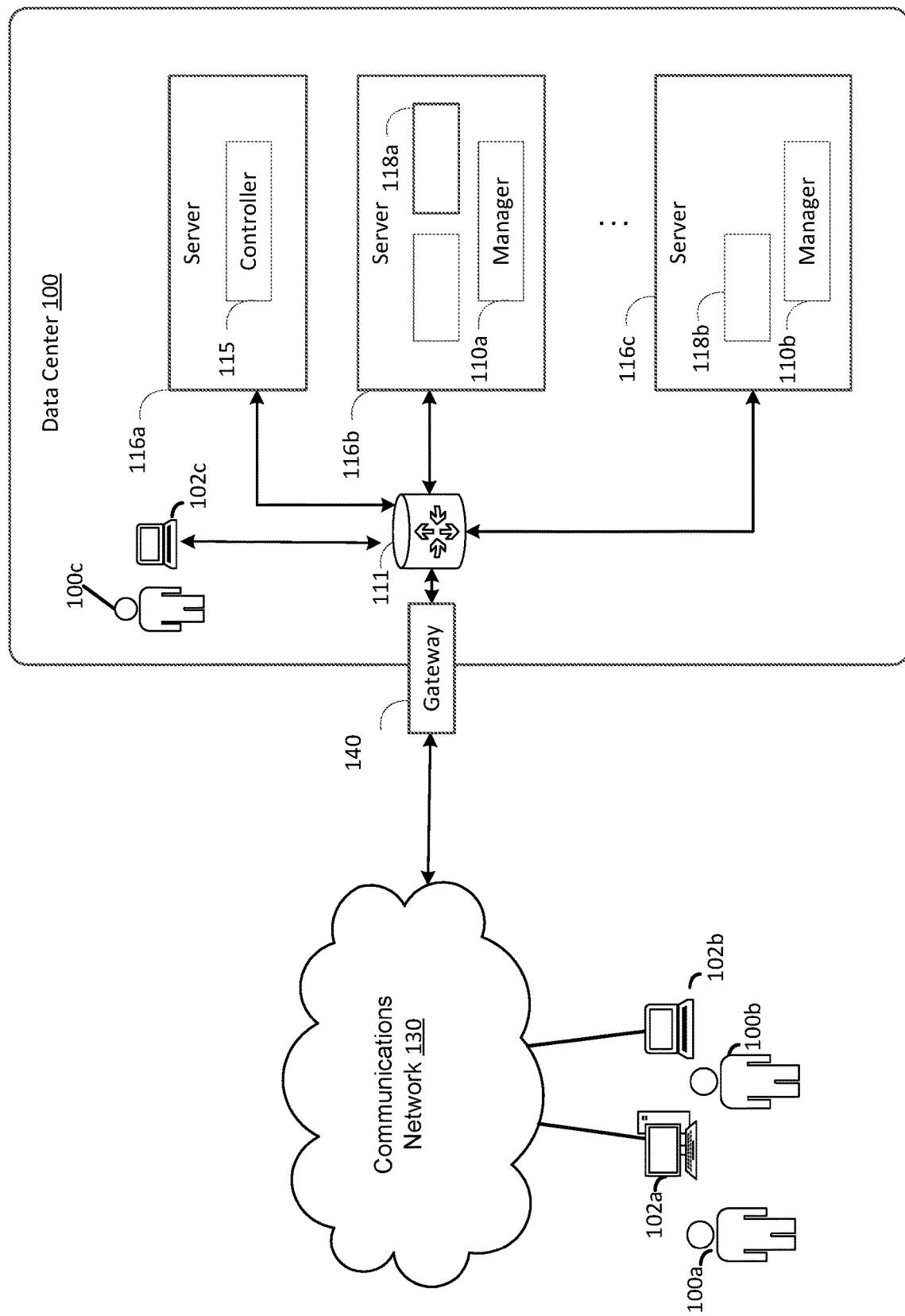
FIG. 1 is a diagram illustrating a data center in accordance with the present disclosure.

Kubernetes natively provides a mechanism for restarting the instances of a service. The object describing the service is a deployment. The deployment may be configured with the desired number of instances of the service. An appropriate number of pods may be created, each corresponding to one such instance. Updating the configuration on a deployment object causes Kubernetes to restart the pods.

However, simply updating the ConfigMap typically has no effect on the deployment object. Typically, Kubernetes services assume that this is an issue that users are to handle manually. For example, one process can be:

Update the ConfigMap
Running services will not notice the change and take action
Manually update configuration such that affected services restart to read the change Such approaches have the disadvantage that they force restarts for all configuration changes, whereas it is typically only some subset of configuration updates that requires a restart. Unnecessary restarts can be detrimental to service availability and reliability.

If a service restarts when it identifies such a change, then all instances will typically restart simultaneously, which can result in unwanted downtime. The present disclosure addresses the general situation where all instances of a microservice in a Kubernetes cluster simultaneously require a restart, whereby restarts are managed in a controlled manner to avoid unwanted downtime.

The following Detailed Description describes technologies that provide a new restart controller component implemented in the Kubernetes cluster. A service may expose an API by which the service can declare a requirement to be restarted. The restart controller may control the requested restart in a controlled manner.

In some embodiments, the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

With the restart controller, the sequence on making a change to a configuration may be as follows:

Update the ConfigMap holding the configuration
Instances of the service are configured to detect the change (by running code which allows them to watch the ConfigMap file mounted in their container)

Instances of the service decide whether or not they need restarting and, if yes, make a declaration on the API The restart controller polls the pods If the restart controller detects a pod declaring that it wants to restart, then the restart controller makes an update to the owning deployment This triggers Kubernetes processing to restart the affected pods in turn The user need only to update the ConfigMap. Service restart may be initiated automatically, the pods being restarted in a controlled manner, if and only if required.

In an embodiment, services that are to be managed by the restart controller may be configured by adding a label to the relevant pod objects. The restart controller may only attempt to poll the new API on pods that declare (via this label) that they are taking part in the described restart scheme.

In an embodiment, an annotation may be added to the pods that indicate to the Restart Controller and endpoint where the pods will indicate that a restart is required.

The restart controller may be configured to continuously loop and perform the following processing:

Identify the pods with the label indicating that they are exposing the new API

Query those pods to determine if any are to be restarted

For any pod that wants to be restarted, update an annotation on the parent deployment Advantages of the disclosed techniques include that a service restart will be initiated if and only if the service detects that it is needed. The decision to restart is made by the service itself, which enables developers of the service to determine which configuration changes will require a restart. Users do not have to predict which changes require a restart and which do not.

In some embodiments, the restart controller may determine whether to trigger a restart based on the characteristics of the services, relationships between services, or selected metrics. By placing the restart decision in a single component, logic can efficiently be implemented to provide a consistent and centralized way to trigger restarts in a controlled manner.

In some embodiments, the pods can notify the restart controller that a restart is required rather than the restart controller polling the pods.

In some embodiments, the mechanism by which the restart controller determines which pods it should poll may vary. For example, the label indicating participation in the restart mechanism can be placed on the deployment rather than on individual pods. In one embodiment, a custom resource can be implemented that explicitly configures the restart controller, without having to update the service definitions.

In some embodiments, the configuration defining which pods the restart controller interacts with can be implemented using a new custom resource in Kubernetes, for example a RestartableDeployment resource. This can be a copy of the standard Deployment object, and the restart controller can interact with pods in RestartableDeployments and not those in regular deployments.

While the disclosed embodiments are illustrated in a Kubernetes environment, the disclosed techniques can be implemented in other virtualized environments. The disclosed embodiments can be implemented in any virtualized environment having at least some of the following characteristics:

Where a large number of running instances maintain their own configuration.

Where configuration updates provided to running instances may or may not require an instance to be restarted.

Where the ability to restart relies on the current state of other instances in the larger network that a given instance is not aware of Where a separate component can access the state of the instances and can trigger a restart of the instances according to internal logic.

Such environments may include, for example, environments where network functions are running on virtual machines, and an orchestrator plays the role of the restart controller.

FIG. 1 illustrates one example of a general computing environment in which the embodiments described herein may be implemented. FIG. 1 illustrates a data center 100 that is configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines or containers. The virtual machines or containers may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances or containers, such as container instances, virtual machine instances, or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines or containers 118a and 118b (which may be referred to herein singularly as "a virtual machine 118" or in the plural as "the virtual machines 118" or as "a container 118" or in the plural as "the containers 118"). The virtual machines or containers 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines or containers on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines or containers 118 on servers 116, for example.

It should be appreciated that although the embodiments disclosed above are discussed in the context of virtual machines and containers, other types of implementations can be utilized with the concepts and technologies disclosed herein.

In the example data center 100 shown in FIG. 1, a network device 111 may be utilized to interconnect the servers 116a and 116b. Network device 111 may comprise one or more switches, routers, or other network devices. Network device 111 may also be connected to gateway 140, which is connected to communications network 130. Network device 111 may facilitate communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The disclosed embodiments may be implemented in a mobile edge computing (MEC) environment implemented in conjunction with a 4G, 5G, or other cellular network. The MEC environment may include at least some of the components and functionality described in FIG. 1 above. Additionally, components of a 5G network may include network functions such as a Session Management Function (SMF), Policy Control Function (PCF), and N7 interface. A radio access network (RAN) may comprise 5G-capable UEs, a base station gNodeB that communicates with an Access and Mobility Management Function (AMF) in a 5G Core (5GC) network. The 5G network may further comprise a User Plane Function (UPF) and Policy Charging Function (PCF).

Figure 2:
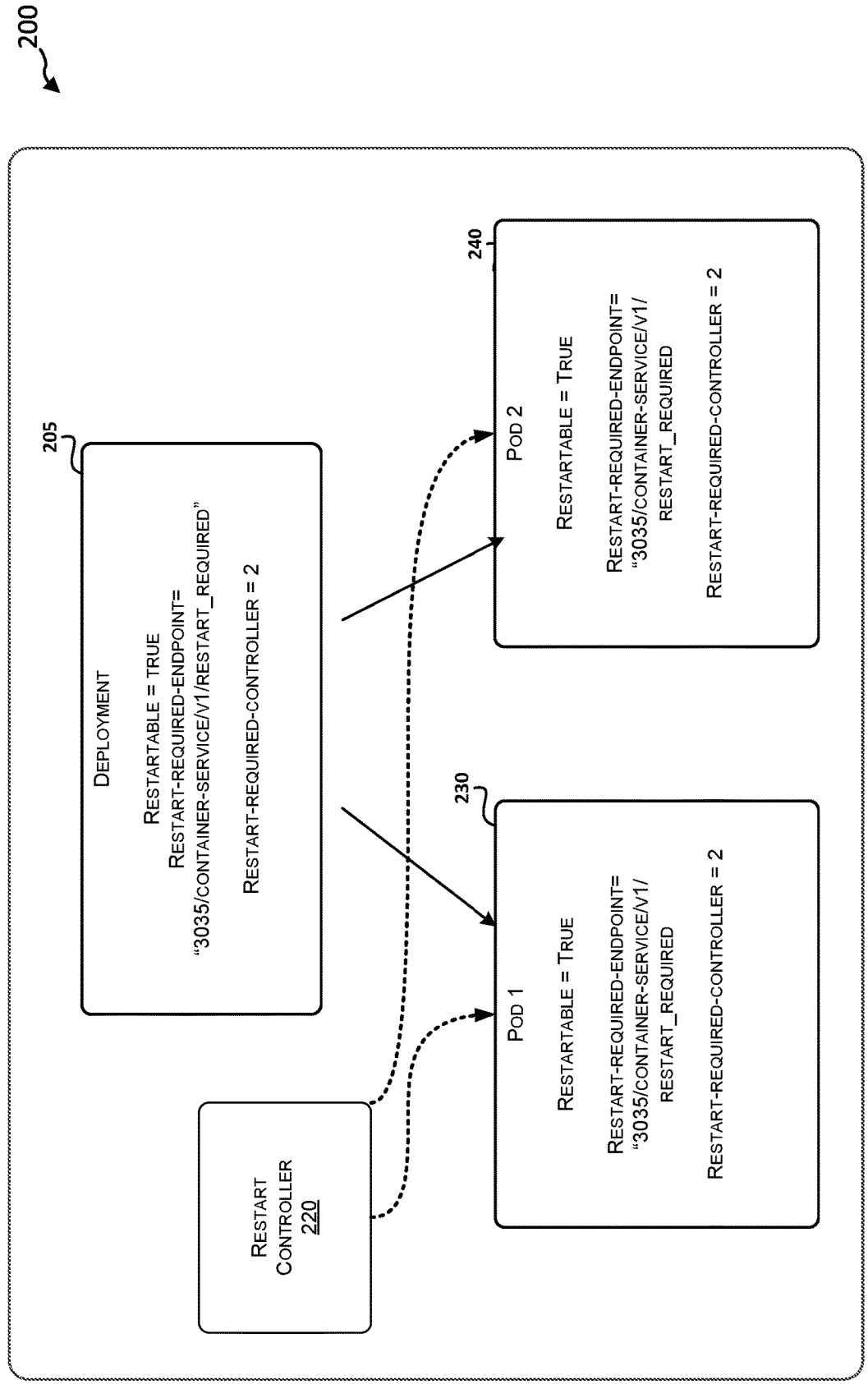
FIG. 2 illustrates an example of a restart controller in accordance with the present disclosure.

Referring to FIG. 2, illustrated is an example cluster 200 where the disclosed techniques can be implemented. FIG. 2 illustrates a deployment comprising restart controller 220, deployment 205, and two pods 230 and 240. In an embodiment, a "restartable" label may be used to indicate that the service implemented in the pod is taking part in the restart mechanism disclosed herein. In an embodiment, a "restart-required-endpoint" annotation may be used to indicate to the restart controller where the API is exposed which indicates whether a restart is required. In an embodiment, a "restart-required-controller" annotation may be incremented by the restart controller to trigger rolling restart of the pods 230 and 240 in deployment 205.

Figure 3:
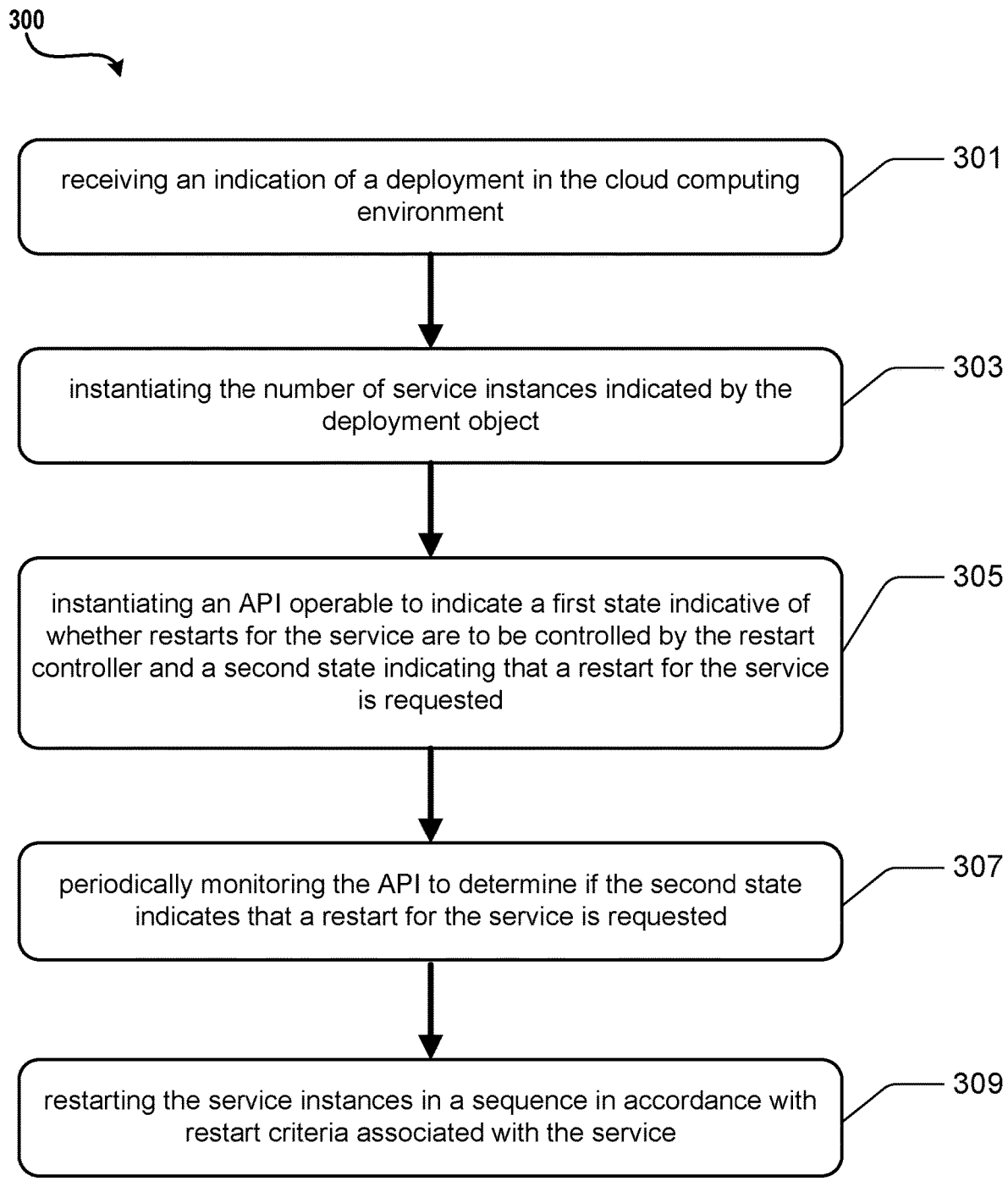
FIG. 3 is a flowchart depicting an example procedure for providing a restart controller in accordance with the present disclosure.

Turning now to FIG. 3, illustrated is an example operational procedure for restarting services in a controlled manner in a cloud computing environment comprising a plurality of computing devices executing a plurality of Kubernetes pods comprising one or more containers. In an embodiment, the services may be defined by one or more deployment objects. Such an operational procedure can be provided by one or more components illustrated in FIGS. 1 and 2. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 300 is described as running on a system, it can be appreciated that the routine 300 and other operations described herein can be executed on an individual computing device or several devices.

Referring to FIG. 3, operation 301 illustrates receiving, by a restart controller executing in the cloud computing environment, an indication of a deployment in the cloud computing environment. In an embodiment, the deployment may be indicated by a deployment object defining a service to be implemented in the cloud computing environment. In an embodiment, the deployment object may indicate a number of instances of the service.

Operation 301 may be followed by operation 303. Operation 303 illustrates instantiating the number of service instances indicated by the deployment object.

Operation 303 may be followed by operation 305. Operation 305 illustrates instantiating an API operable to indicate, by the service, a first state indicative of whether restarts for the service are to be controlled by the restart controller and a second state indicating that a restart for the service is requested.

Operation 305 may be followed by operation 307. Operation 307 illustrates in response to the first state indicating that restarts for the service are to be controlled by the restart controller, periodically monitoring the API to determine if the second state indicates that a restart for the service is requested.

Operation 307 may be followed by operation 309. Operation 309 illustrates in response to determining, by the restart controller, that a restart for the service is requested, restarting the service instances in a sequence in accordance with restart criteria associated with the service.

Figure 4:
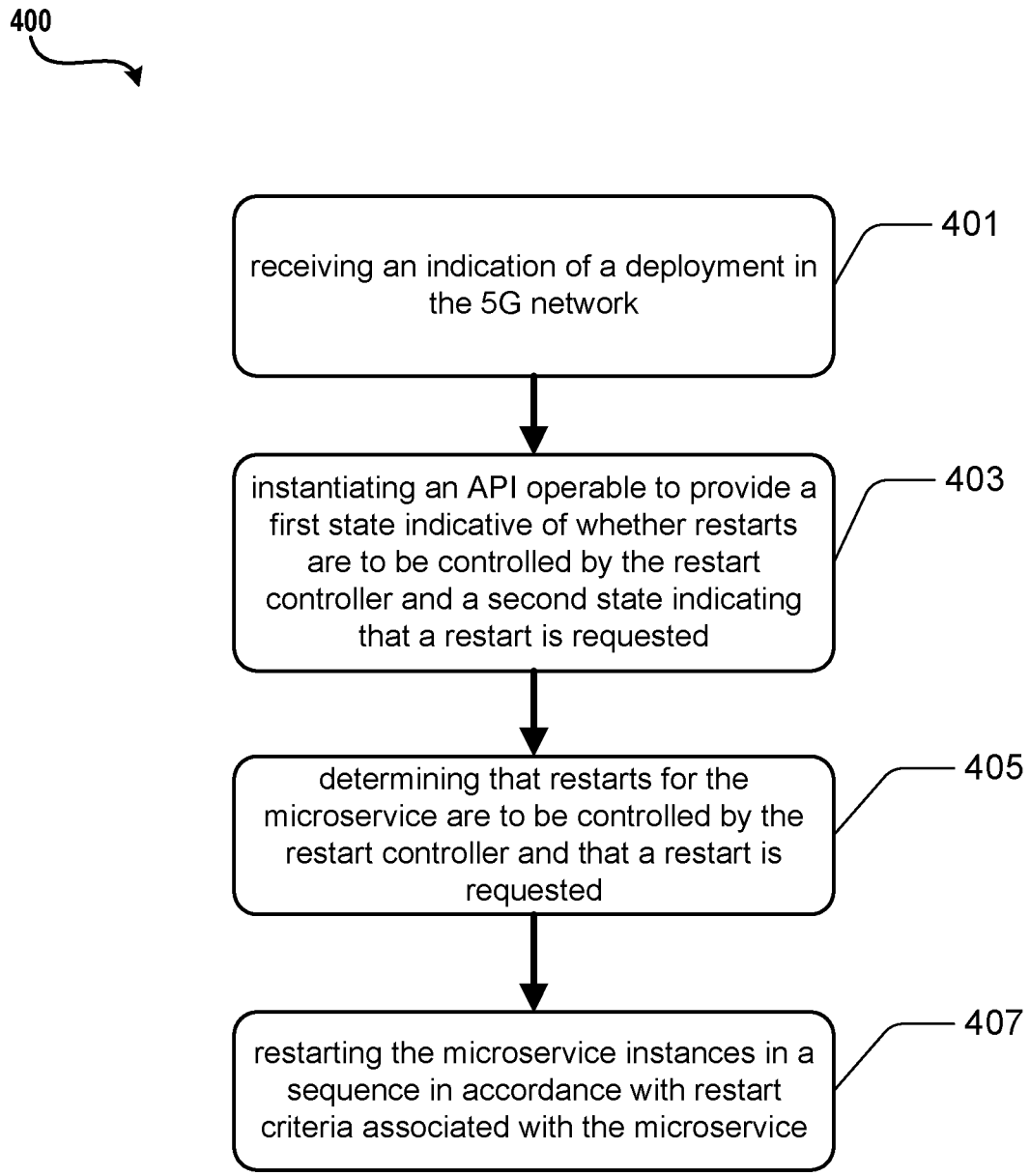
FIG. 4 is a flowchart depicting an example procedure for providing a restart controller in accordance with the present disclosure.

Referring to FIG. 4, illustrated is an example operational procedure for restarting microservices in a controlled manner in a 5G network comprising a plurality of computing devices hosting a plurality of container clusters executing one or more network functions of the 5G network. Such an operational procedure can be provided by services shown in FIGS. 1 and 2. The operational procedure may be implemented in a system comprising one or more computing devices. Referring to FIG. 4, operation 401 illustrates receiving, by a restart controller executing in the 5G network, an indication of a deployment in the 5G network. In an embodiment, the deployment may define a service to be implemented in the 5G network. In an embodiment, the deployment may include a desired number of instances of the microservice. In an embodiment, the desired number of microservice instances may be instantiated in the 5G network.

Operation 401 may be followed by operation 403. Operation 403 illustrates instantiating an API operable to provide a first state indicative of whether restarts for the microservice are to be controlled by the restart controller and a second state indicating that a restart microservice is requested.

Operation 403 may be followed by operation 405. Operation 405 determining, by the restart controller via the API, that restarts for the microservice are to be controlled by the restart controller and that a restart is requested.

Operation 405 may be followed by operation 407. Operation 407 illustrates in response to determining, by the restart controller via the API, that restarts for the microservice are to be controlled by the restart controller and that a restart is requested, restarting the microservice instances in a sequence in accordance with restart criteria associated with the microservice.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 5:
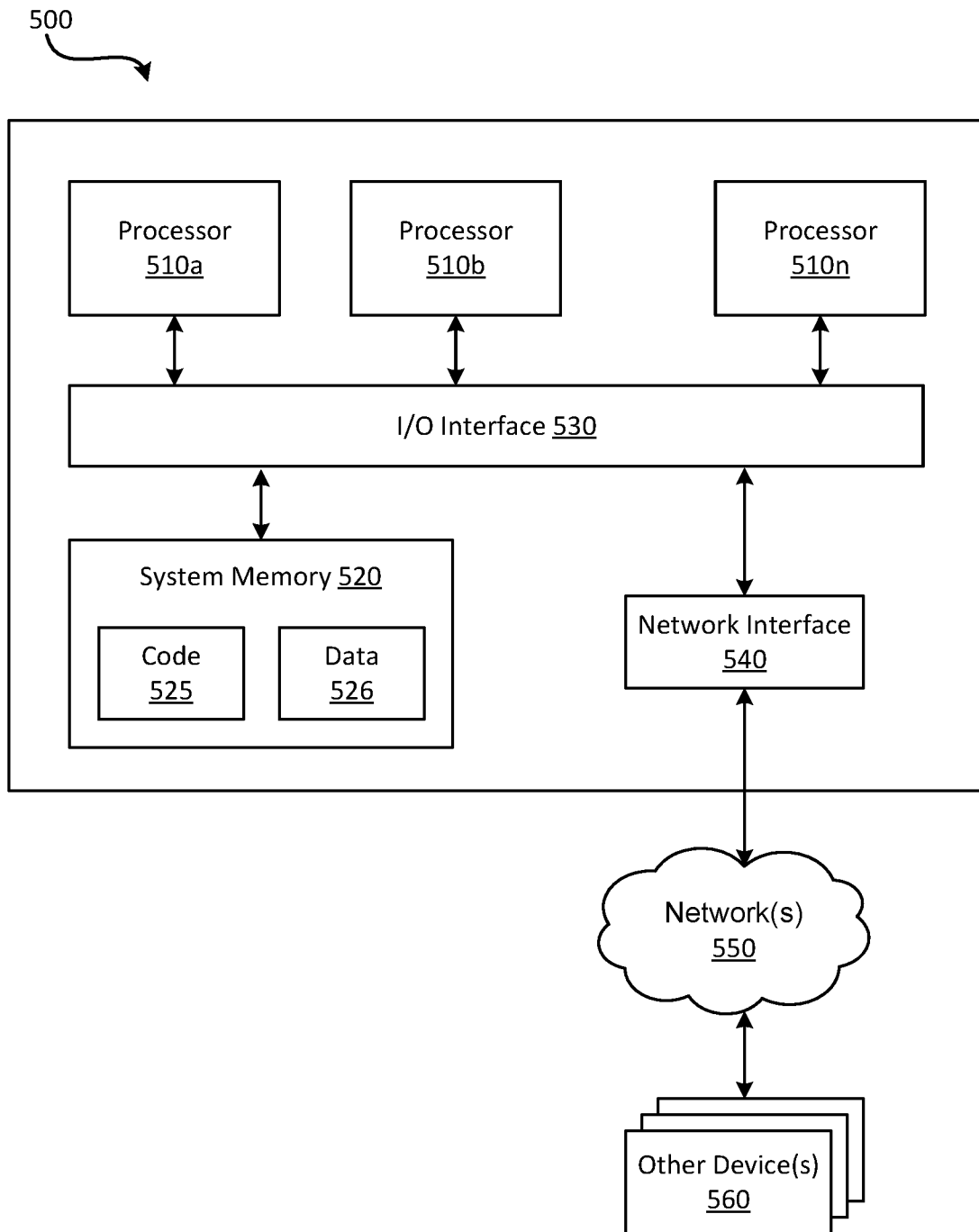
FIG. 5 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 5 illustrates such a general-purpose computing device 500. In the illustrated embodiment, computing device 500 includes one or more processors 510a, 510b, and/or 510n (which may be referred herein singularly as "a processor 510" or in the plural as "the processors 510") coupled to a system memory 520 via an input/output (I/O) interface 530. Computing device 500 further includes a network interface 540 coupled to I/O interface 530.

In various embodiments, computing device 500 may be a uniprocessor system including one processor 510 or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x56, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 520 as code 525 and data 526.

In one embodiment, I/O interface 530 may be configured to coordinate I/O traffic between the processor 510, system memory 520, and any peripheral devices in the device, including network interface 540 or other peripheral interfaces. In some embodiments, I/O interface 530 may perform any necessary protocol, timing, or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components. Also, in some embodiments some or all of the functionality of I/O interface 530, such as an interface to system memory 520, may be incorporated directly into processor 510.

Network interface 540 may be configured to allow data to be exchanged between computing device 500 and other device or devices 560 attached to a network or network(s) 550, such as other computer systems or devices as illustrated in FIGS. 1 through 4, for example. In various embodiments, network interface 540 may support communication via any suitable wired or wireless general data networks, such as types of Ethernet networks, for example. Additionally, network interface 540 may support communication via telecommunications/telephony networks such as analog voice networks or digital fiber communications networks, via storage area networks such as Fibre Channel SANs or via any other suitable type of network and/or protocol.

In some embodiments, system memory 520 may be one embodiment of a computer-accessible medium configured to store program instructions and data as described above for FIGS. 1-4 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 500 as system memory 520 or another type of memory. Further, a computer-accessible medium may include transmission media or signals such as electrical, electromagnetic or digital signals, conveyed via a communication medium such as a network and/or a wireless link, such as may be implemented via network interface 540. Portions or all of multiple computing devices, such as those illustrated in FIG. 5, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for restarting services in a controlled manner in a cloud computing environment comprising a plurality of computing devices executing a plurality of Kubernetes pods comprising one or more containers, the services defined by one or more deployment objects, the method comprising:

receiving, by a restart controller executing in the cloud computing environment, an indication of a deployment in the cloud computing environment, the deployment indicated by a deployment object defining a service to be implemented in the cloud computing environment, the deployment object indicating a number of instances of the service;

instantiating the number of service instances indicated by the deployment object;

instantiating an API operable to indicate, by the service, a first state indicative of whether restarts for the service are to be controlled by the restart controller and a second state indicating that a restart for the service is requested;

in response to the first state indicating that restarts for the service are to be controlled by the restart controller, periodically monitoring the API to determine if the second state indicates that a restart for the service is requested; and in response to determining, by the restart controller, that a restart for the service is requested, restarting the service instances in a sequence in accordance with restart criteria associated with the service.

Clause 2: The method of clause 1, wherein the restart criteria is configurable and indicated by the deployment object.

Clause 3: The method of any of clauses 1-2, wherein the service instances are restarted in a sequence according to a stored value that is set by the restart controller.

Clause 4: The method of any of clauses 1-3, wherein the stored value is incremented to a value indicative of a number of instances of the service.

Clause 5: The method of any of clauses 1-4, wherein the restart criteria includes a rolling restart that prevents a threshold number of service instances from being restarted in parallel.

Clause 6: The method of any of clauses 1-5, wherein the restart criteria includes a restart sequence that maintains a minimum number of active service instances.

Clause 7: The method of clauses 1-6, wherein determining that the service instances are to be restarted is based on an update to a ConfigMap object.

Clause 8: The method of any of clauses 1-7, wherein the service instances are configured to determine whether a restart is required based on the update to the ConfigMap object.

Clause 9: A method for restarting microservices in a controlled manner in a 5G network comprising a plurality of computing devices hosting a plurality of container clusters executing one or more network functions of the 5G network, the method comprising:

receiving, by a restart controller executing in the 5G network, an indication of a deployment in the 5G network, the deployment defining a service to be implemented in the 5G network, the deployment including a desired number of instances of the microservice, wherein the desired number of microservice instances are instantiated in the 5G network;

instantiating an API operable to provide a first state indicative of whether restarts for the microservice are to be controlled by the restart controller and a second state indicating that a restart microservice is requested; and in response to determining, by the restart controller via the API, that restarts for the microservice are to be controlled by the restart controller and that a restart is requested:

restarting the microservice instances in a sequence in accordance with restart criteria associated with the microservice.

Clause 10: The system of clause 9, wherein the second state indicating that a restart is required is an endpoint indicated via the API.

Clause 11: The system of any of clauses 9 and 10, wherein the first state is indicated by a deployment object.

Clause 12: The system of any clauses 9-11, wherein a custom resource is used to configure the restart controller.

Clause 13: The system of any clauses 9-12, further comprising implementing a custom resource defining deployments to be controlled by the restart controller, wherein the restart controller is configured to interact with microservice instances as defined by the custom resource.

Clause 14: The system of any clauses 9-13, wherein the restart controller is configured to execute a continuous loop to determine which clusters are to be controlled by the restart controller and which clusters require a restart.

Clause 15: The system of any clauses 9-14, wherein the microservice instances are restarted in a sequence according to a stored value that is set by the restart controller.

Clause 16: A computer-readable storage medium having computer-executable instructions stored thereupon which, when executed by one or more processors of a computing device, cause the computing device to perform operations comprising:

receiving, by a restart controller executing in a cluster in a cloud computing environment, an indication of a deployment in the cloud computing environment, the deployment defining a service to be implemented in the cloud computing environment, the deployment including a desired number of instances of the service;

determining a first state indicative of whether restarts for the service instances are to be controlled by the restart controller and a second state indicating that a restart for the service instances is requested; and in response to determining, by the restart controller, that restarts for the service instances are to be controlled by the restart controller and that a restart is requested:

restarting the service instances in a sequence in accordance with restart criteria associated with the service.

Clause 17: The computer-readable storage medium of clause 16, wherein the restart controller is configured to determine whether to trigger a restart.

Clause 18: The computer-readable storage medium of any of clauses 16 and 17, wherein the determination is based on a relationship between services or metrics.

Clause 19: The computer-readable storage medium of any of the clauses 16-18, wherein the service instances notify the restart controller that a restart is requested.

Clause 20: The computer-readable storage medium of any of the clauses 16-19, wherein the restart controller polls the service instances to determine that a restart is requested.

What is claimed is:

1. A method for restarting services in a controlled manner in a cloud computing environment comprising a plurality of computing devices executing a plurality of Kubernetes pods comprising one or more containers, the services defined by one or more deployment objects, the method comprising:

receiving, by a restart controller executing in the cloud computing environment, an indication of a deployment in the cloud computing environment, the deployment indicated by a deployment object defining a service to be implemented in the cloud computing environment, the deployment object indicating a number of instances of the service;

instantiating the number of service instances indicated by the deployment object;

instantiating an application programming interface (API) operable to indicate, by the service, a first state indicative of whether restarts for the instances of the service are to be controlled by the restart controller and a second state indicating that a restart for the instances of the service is requested;

in response to the first state indicating that restarts for the instances of the service are to be controlled by the restart controller, periodically monitoring the API to determine if the second state indicates that a restart for the instances of the service is requested; and in response to determining, by the restart controller, that a restart for the instances of the service is requested, restarting the instances of the service in a controlled manner and in a sequence in accordance with restart criteria associated with the instances of the service to prevent downtime of the service during the restart.

2. The method of claim 1, wherein the restart criteria are configurable and indicated by the deployment object.

3. The method of claim 1, wherein the instances of the service are restarted in a sequence according to a stored value that is set by the restart controller.

4. The method of claim 3, wherein the stored value is incremented to a value indicative of the number of instances of the service.

5. The method of claim 1, wherein the restart criteria include a rolling restart that prevents a threshold number of service instances from being restarted in parallel.

6. The method of claim 1, wherein the restart criteria include a restart sequence that maintains a minimum number of active service instances.

7. The method of claim 1, wherein determining that the instances of the service are to be restarted is based on an update to a ConfigMap object.

8. The method of claim 7, wherein the instances of the service are configured to determine whether a restart is required based on the update to the ConfigMap object.

9. A method for restarting microservices in a controlled manner in a 5G network comprising a plurality of computing devices hosting a plurality of container clusters executing one or more network functions of the 5G network, the method comprising:
  receiving, by a restart controller executing in the 5G network, an indication of a deployment in the 5G network, the deployment defining a service to be implemented in the 5G network, the deployment including a desired number of instances of the microservice, wherein the desired number of microservice instances are instantiated in the 5G network;
  instantiating an API operable to provide a first state indicative of whether restarts for the instances of the microservice are to be controlled by the restart controller and a second state indicating that a restart for the instances of the microservice is requested; and
  in response to determining, by the restart controller via the API, that restarts for the instances of the microservice are to be controlled by the restart controller and that a restart is requested:
  restarting the instances of the microservice in a controlled manner and in a sequence in accordance with restart criteria associated with the instances of the microservice to prevent downtime of the service during the restart.

10. The method of claim 9, wherein the second state indicating that a restart is required is an endpoint indicated via the API.

11. The method of claim 9, wherein the first state is indicated by a deployment object.

12. The method of claim 9, wherein a custom resource is used to configure the restart controller.

13. The method of claim 9, further comprising implementing a custom resource defining deployments to be controlled by the restart controller, wherein the restart controller is configured to interact with microservice instances as defined by the custom resource.

14. The method of claim 9, wherein the restart controller is configured to execute a continuous loop to determine which clusters are to be controlled by the restart controller and which clusters require a restart.

15. The method of claim 9, wherein the instances of the microservice are restarted in a sequence according to a stored value that is set by the restart controller.

16. A computer-readable storage medium having computer-executable instructions stored thereupon which, when executed by one or more processors of a computing device, cause the computing device to perform operations comprising:
  receiving, by a restart controller executing in a cluster in a cloud computing environment, an indication of a deployment in the cloud computing environment, the deployment defining a service to be implemented in the cloud computing environment, the deployment including a desired number of instances of the service;
  determining a first state indicative of whether restarts for the instances of the service are to be controlled by the restart controller and a second state indicating that a restart for the instances of the service is requested; and
  in response to determining, by the restart controller, that restarts for the instances of the service are to be controlled by the restart controller and that a restart is requested:
  restarting the instances of the service in a controlled manner and in a sequence in accordance with restart criteria associated with the service to prevent downtime of the service during the restart.

17. The computer-readable storage medium of claim 16, wherein the restart controller is configured to determine whether to trigger a restart.

18. The computer-readable storage medium of claim 17, wherein the determination is based on a relationship between services and metrics.

19. The computer-readable storage medium of claim 16, wherein the instances of the service notify the restart controller that a restart is requested.

20. The computer-readable storage medium of claim 19, wherein the restart controller polls the instances of the service to determine that a restart is requested.

* * * * *